(12) United States Patent
Fujiyama et al.

(10) Patent No.: US 11,473,695 B2
(45) Date of Patent: Oct. 18, 2022

(54) ACTUATOR

(71) Applicant: TAKATORI SEISAKUSHO Co., Ltd., Ukiha (JP)

(72) Inventors: Kojiro Fujiyama, Ukiha (JP); Haruhiko Takahashi, Kawasaki (JP)

(73) Assignee: TAKATORI SEISAKUSHO Co., Ltd., Ukiha (JP)

( * ) Notice: Subject to any disclaimer, the term of this patent is extended or adjusted under 35 U.S.C. 154(b) by 0 days.

(21) Appl. No.: 15/734,422

(22) PCT Filed: Nov. 26, 2019

(86) PCT No.: PCT/JP2019/046158
§ 371 (c)(1),
(2) Date: Dec. 2, 2020

(87) PCT Pub. No.: WO2021/106071
PCT Pub. Date: Jun. 3, 2021

(65) Prior Publication Data
US 2022/0290776 A1 Sep. 15, 2022

(51) Int. Cl.
*F16K 31/53* (2006.01)
*F16H 49/00* (2006.01)
*F16K 37/00* (2006.01)
*F16K 31/04* (2006.01)

(52) U.S. Cl.
CPC .......... *F16K 31/53* (2013.01); *F16H 49/001* (2013.01); *F16K 31/047* (2013.01); *F16K 37/0041* (2013.01)

(58) Field of Classification Search
CPC ..................... F16H 49/001; F16K 31/047
See application file for complete search history.

(56) References Cited

U.S. PATENT DOCUMENTS

| | | | | | |
|---|---|---|---|---|---|
| 3,216,285 | A | * | 11/1965 | Nasvytis | F16H 13/06 475/183 |
| 3,921,264 | A | * | 11/1975 | Madonian | H02K 7/10 475/349 |
| 4,157,668 | A | * | 6/1979 | Fukuma | F16H 57/0487 475/159 |
| 4,918,344 | A | * | 4/1990 | Chikamori | H02K 7/116 475/183 |
| 5,865,272 | A | * | 2/1999 | Wiggins | F16K 31/047 74/89.31 |
| 8,651,455 | B2 | * | 2/2014 | Albert | F02M 26/67 123/568.24 |
| 9,816,592 | B1 | * | 11/2017 | Glikin | F16K 31/047 |
| 10,113,618 | B2 | * | 10/2018 | Schorsch | F16H 13/06 |

FOREIGN PATENT DOCUMENTS

| | | |
|---|---|---|
| JP | H09329259 A | 12/1997 |
| JP | 2003-232411 A | 8/2003 |
| JP | 2004-232779 A | 8/2004 |

* cited by examiner

*Primary Examiner* — Eric Keasel
(74) *Attorney, Agent, or Firm* — Heedong Chae; Lucem, PC

(57) ABSTRACT

An actuator that is capable of securing sufficient quietness when driven, that is small in size, that has excellent power transmission performance because of a high reduction ratio, and that is capable of performing highly accurate control. The actuator functions as a valve actuator that opens or closes a valve. The actuator includes a drive transmission gear, a motor, a friction drive speed reducer, a wave gear reducer, and an absolute encoder.

9 Claims, 5 Drawing Sheets

ACTUATOR

FIELD OF THE INVENTION

The present invention relates to an actuator. More particularly, the present invention relates to an actuator that is capable of securing sufficient quietness when driven, that is small in size, that has excellent power transmission performance because of a high reduction ratio, and that is capable of performing highly accurate control.

BACKGROUND OF THE INVENTION

An actuator has been conventionally widely used as a drive source that converts energy, such as electric energy or hydraulic energy, into mechanical motion and actuates devices.

Additionally, various types of actuators exist according to their operation principle types or their purposes of use, and a valve actuator that is connected to a valve and that opens or closes the valve by means of the rotational force of a motor has been proposed in, for example, Patent Literature 1.

Citation List

Patent Literature

Japanese Published Unexamined Patent Application No. H9-329259

SUMMARY OF THE INVENTION

Technical Problem

Here, in conventional actuators, it is possible to find many of them that have been intended to be reduced in device size or to be heightened in output, but there is almost no actuator in which consideration has been taken to quietness when driven.

Additionally, with respect to actuators, examples of purposes of use that are required to achieve excellent quietness include the following contents.

A first example is an actuator that opens or closes a valve placed in a pipe installed in an escort ship that needs strict quietness. Many valves in each of which an actuator is placed are installed in the ship, and are required to reduce a drive sound occurring from the actuator.

Additionally, likewise, with respect to an actuator related to the driving of a robotic arm of a submarine type robot that explores seabed resources or the like, the occurrence of sounds and/or vibrations caused during driving disturbs precise work, and therefore quietness is required to be maintained.

Still additionally, there is also an actuator that adjusts the focus of a lens in a camera for stage photography, such as theatrical play photography. There is a request to reduce a sound occurring from the camera during photographing as much as possible so as not to disturb a stage performance during photographing.

The present invention has been made in consideration of these circumstances, and it is an object of the present invention to provide an actuator that is capable of securing sufficient quietness when driven, that is small in size, that has excellent power transmission performance because of a high reduction ratio, and that is capable of performing highly accurate control.

Solution to Problem

To achieve the aforementioned object, the actuator of the present invention includes a motor that serves as a drive source, a friction-drive-type first speed reducer that is connected to the motor, a second speed reducer that is connected to the first speed reducer and that is formed of a gear reducer, and a final shaft that is connected to the second speed reducer and to a predetermined rotational mechanism and that transmits output of the motor to the predetermined rotational mechanism.

Here, it is possible to output torque according to a reduction ratio of the first speed reducer and according to a reduction ratio of the second speed reducer from the output of the motor and allow the torque to act on the predetermined rotational mechanism by means of the motor serving as a drive source, by means of the first speed reducer connected to the motor, by means of the second speed reducer connected to the first speed reducer, and by means of the final shaft that is connected to the second speed reducer and to the predetermined rotational mechanism and that transmits the output of the motor to the predetermined rotational mechanism. Additionally, the two speed reducers differing from each other in type are used, hence making it possible to obtain a great torque although the structure of the entire actuator is small in size.

Additionally, the first speed reducer is a friction-drive-type speed reducer that is connected to the motor, and the second speed reducer is connected to the first speed reducer and is formed of a gear reducer, and therefore a drive sound caused by the first speed reducer becomes a small sound. Additionally, the rotation speed created by the motor is reduced in accordance with the reduction ratio of the first speed reducer, and is then transmitted to the second speed reducer, hence making it possible to more gradually reduce the operating speed in the second speed reducer during deceleration than in a configuration in which a reduction ratio similar in level is obtained by only the second speed reducer without the first speed reducer. In other words, it becomes possible to restrict a drive sound caused by the second speed reducer, which is a gear reducer, to a small level. Additionally, it is possible to create a certain speed-reduction effect by means of the friction-drive-type speed reducer, and, in addition to this, it is possible to obtain a great speed-reduction effect in the gear reducer, and therefore it is possible to obtain a high reduction ratio by this two-step speed reduction. As a result, it is possible to obtain a great torque while restricting a drive sound caused by the actuator to a small level.

If the second speed reducer is a wave gear reducer, the second speed reducer tends to have a small-sized structure, and a high reduction ratio is obtainable.

If the magnitude of a drive sound caused when the output of the motor is transmitted to the final shaft is 30 db or less, the drive sound occurring at that time is restricted to a sufficiently small sound. The term "a drive sound caused when the output of the motor is transmitted to the final shaft" mentioned here means a drive sound in a state in which the final shaft, to which the output of the motor has been transmitted, is rotating, i.e., a drive sound caused by the entire actuator when the actuator is driven.

If the pulse modulation frequency that controls the motor is 20 kHz or more, a period of time during which a control signal is output when the motor is actuated becomes sufficiently short, and the operation of the motor is made smoother, hence making it possible to reduce a drive sound occurring from the motor. The frequency of 20 kHz or more is a frequency that exceeds an audible range (20 Hz to 20 kHz) that is a range of frequencies audible by the human ear.

If the actuator includes an absolute encoder that is attached to the final shaft, that stores an absolute position of the final shaft, and that performs position control relative to rotation of the final shaft so that resolution of the rotation of the final shaft becomes ±0.0125 degrees or less, it becomes possible to highly accurately perform the position control. In other words, it is possible to set the reproducibility of a rotational operation in the predetermined rotational mechanism at ±0.25 degrees or less, for example, when power is transmitted between a gear included in the predetermined rotational mechanism and the final shaft. The term "reproducibility" mentioned here is an index that represents position accuracy with which the rotational operation is stopped at a desired position while allowing the predetermined rotational mechanism to perform multiple rotations. The term "storing an absolute position of the final shaft" mentioned here means that positional information in the rotational operation of the final shaft is stored even in a power OFF state in which electric power is not supplied to the motor and that a return-to-origin operation is needless when electric power is again supplied to the motor.

If the first speed reducer has a rotor portion into which the rotation of the motor is input and if the rotor portion has a Shore hardness of from 85 to 95, the rotor portion is allowed to easily maintain a repulsive force against the motor being in contact with the rotor portion, and is not easily deformed while being in contact with the motor, and therefore contact pressure between the motor and the rotor portion becomes an appropriate magnitude. As a result, the power transmission performance between the motor and the rotor portion becomes excellent, hence making it possible to prevent the occurrence of noise when the motor and the rotor portion rotate at a high speed.

On the other hand, if the rotor portion has a Shore hardness of less than 85, the rotor portion is soft, and the amount of deformation becomes great when the rotor portion comes into contact with the motor, and a period of time that is spent until its deformed shape is restored to its original shape becomes long. As a result, the rotor portion that has been deformed and the motor come into contact with each other, and a sound easily occurs. If the rotor portion has a Shore hardness of more than 95, the rotor portion that has come into contact with the motor is not easily deformed in motion in which the rotor portion and the motor rotate while being in contact with each other, and there is a concern that rotational resistance will occur.

If the first speed reducer has a rotor portion into which the rotation of the motor is input and a roller portion that is disposed outside the rotor portion and that transmits the output of the motor to the second speed reducer while an inner peripheral surface of the roller portion is being in contact with an outer peripheral surface of the rotor portion, and if the outer peripheral surface of the rotor portion and the inner peripheral surface of the roller portion are each formed so as to be a smooth surface whose surface roughness Ra is 1.6 or less, the contact between the outer peripheral surface of the rotor portion and the inner peripheral surface of the inner roller is characterized by the fact that adhesive properties of both surfaces are heightened and the fact that air does not easily enter a space between both surfaces, thus making it possible to increase frictional resistance. This makes it possible to improve the power transmission performance between the rotor portion and the inner roller, and makes it possible to prevent the occurrence of a sound when the motor and the rotor portion rotate.

If a reduction ratio from the motor to the final shaft is 1:150 to 1:500, it becomes possible to obtain a sufficiently great torque from the actuator. At this time, a mode is conceivable in which, for example, the reduction ratio in the first speed reducer becomes 1:5 and in which, for example, the reduction ratio in the second speed reducer becomes 1:30 to 1:100.

If the predetermined rotational mechanism is a valve rod of a valve connected to the final shaft through a gear, it is possible to rotate the valve rod of the valve by means of the actuator. With respect to the kind of the valve mentioned here, specific limitations are not imposed on its kind if the valve is a valve that performs opening/closing by rotary motion.

Advantageous Effects of Invention

The actuator according to the present invention is capable of securing sufficient quietness when driven, is small in size, has excellent power transmission performance because of a high reduction ratio, and is capable of performing highly accurate control.

DETAILED DESCRIPTION OF THE EMBODIMENTS OF THE INVENTION

An embodiment of the present invention will be hereinafter described so as to gain a better understanding of the present invention.

An actuator 1 that is an example of an actuator to which the present invention is applied will be described. A structure in which the actuator 1 is disposed at a valve 2 is shown in the following example. In other words, the actuator 1 functions as a valve actuator that opens or closes the valve 2.

Figure 1:
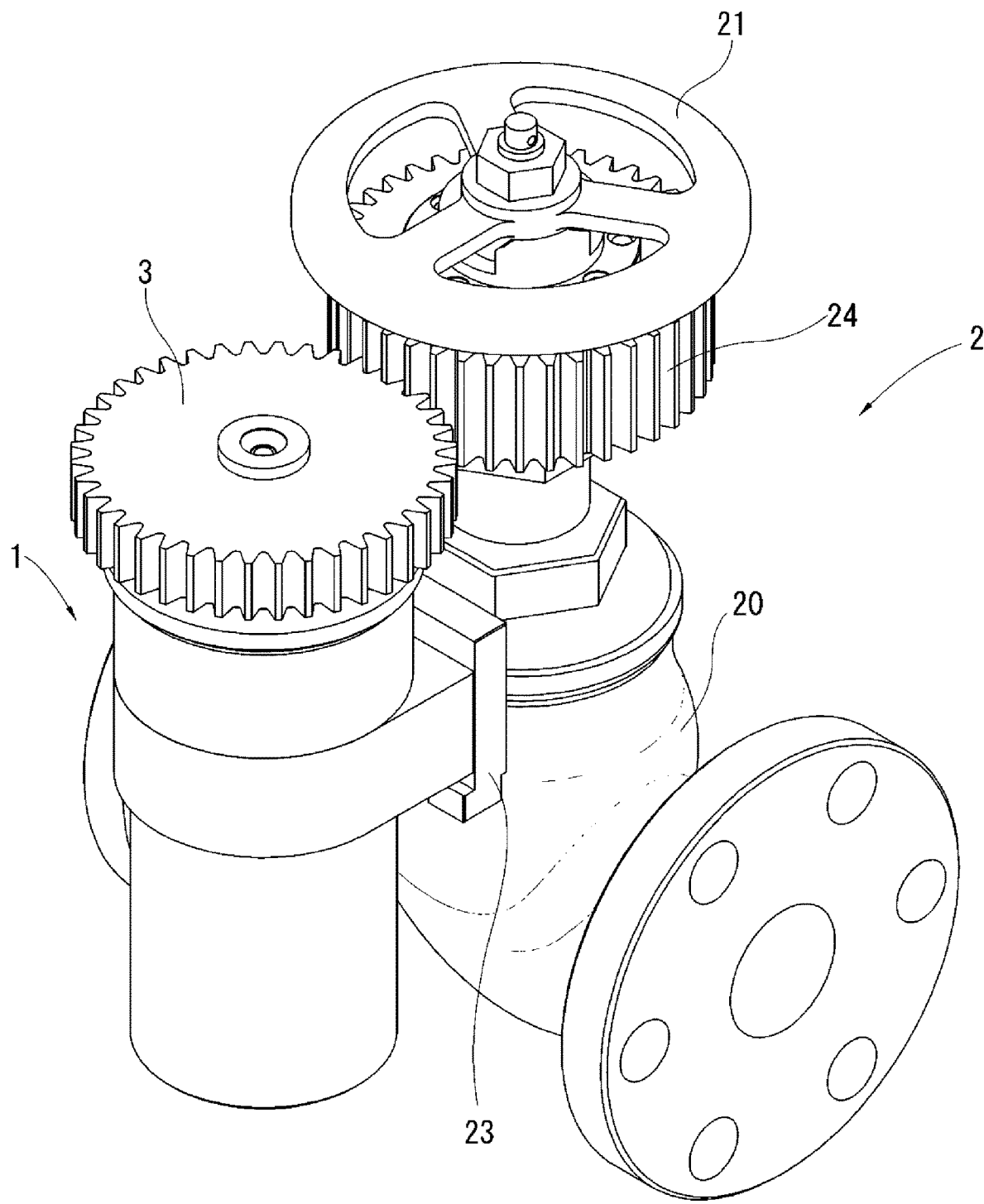
FIG. 1 is a schematic descriptive view showing a valve to which an actuator, which is an example of an actuator according to the present invention, has been attached.

As shown in FIG. 1, the valve 2 includes a valve body 20, a handle 21, a valve rod (not shown), a holder 23, and the actuator 1.

The valve 2 is a member that is installed in a predetermined pipe or the like and that controls a fluid inside the valve body 20 by rotating the valve rod. The actuator 1 is attached to the valve rod of the valve through the holder 23.

The actuator 1 is a drive device that outputs torque by which the valve rod of the valve 2 is rotated. The actuator 1 is provided with a drive transmission gear 3.

The drive transmission gear 3 is a member that engages a shaft-side gear 24 attached to the valve rod, and transmits torque, which has been output from the actuator 1, to the valve rod. The drive transmission gear 3 is a member equivalent to a final shaft defined in the appended claims.

The drive transmission gear 3 of the actuator 1 is configured so that it can output a torque of 50 Nm to 100 Nm to the valve rod of the valve 2.

Here, the actuator to which the present invention has been applied is not necessarily required to function as a valve actuator that is used to open or close the valve 2, and the actuator to which the present invention has been applied is usable as a drive device for a piece of equipment having a rotational mechanism. In other words, it is possible to use the actuator of the present invention as a device that gives a driving force for a rotational operation not only to valves but also to equipment required to have such a rotational operation in order to fulfill its function. The actuator of the present invention is usable when equipment or the like is required to be small in size and to be noiseless, and is usable as an actuator of, for example, AUV (Autonomous Underwater Vehicle) or UUV (Unmanned Undersea Vehicle) and other autonomous unmanned underwater vehicle or as an actuator for joints of a welfare robot.

Additionally, specific limitations are not imposed on the kind of a valve to which the actuator 1 is attached, and the actuator 1 is attachable to a valve if this valve has a rotational mechanism.

Additionally, the torque generated from the drive transmission gear 3 of the actuator 1 is not necessarily limited to 50 Nm to 100 Nm. It is possible to appropriately set the value of the torque generated from the drive transmission gear 3 of the actuator 1 in accordance with the kind of or the desired performance of equipment in which the actuator is installed. However, in the actuator 1 that rotates the valve rod of the valve 2, it is preferable to set the torque generated from the drive transmission gear 3 of the actuator 1 at 50 Nm to 100 Nm in order to sufficiently secure the rotational operation of the valve rod.

Additionally, specific limitations are not imposed on an attaching structure formed to attach the actuator 1 to the valve 2 shown in FIG. 1, and structures except the attaching structure through the holder 23 can be employed. Still additionally, it is only necessary to forma structure in which an actuator is attached directly or indirectly to a valve so as to enable the actuator to which the present invention has been applied to rotate the valve rod of the valve. For example, it is possible to employ not only a structure in which the actuator is disposed beside the valve body 20 as shown in FIG. 1 but also a structure in which the actuator is disposed above the valve body 20 (or the handle 21).

Figure 2A:
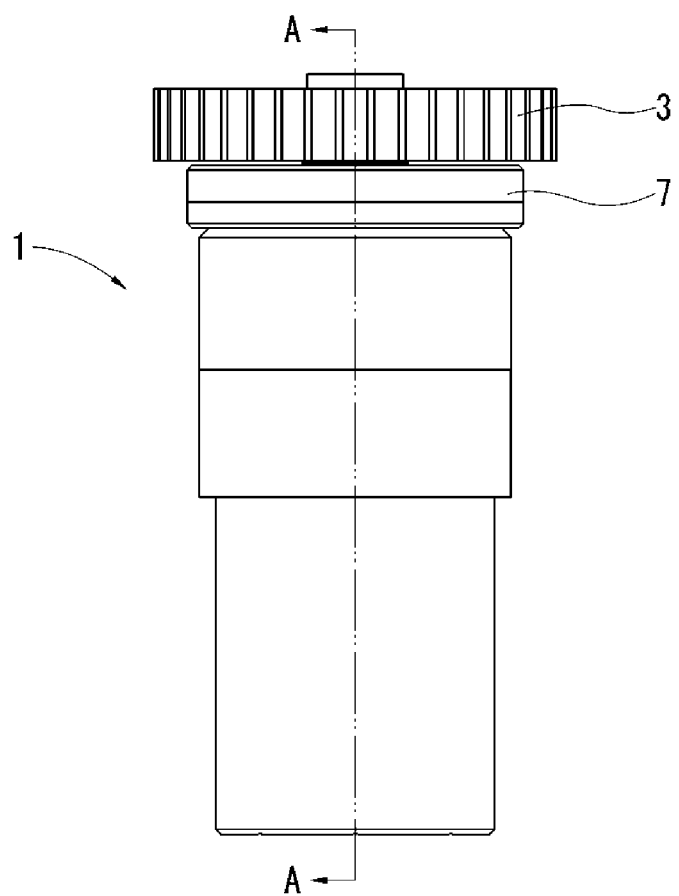
FIG. 2A is a schematic view showing an overall structure of the actuator.
Figure 2B:
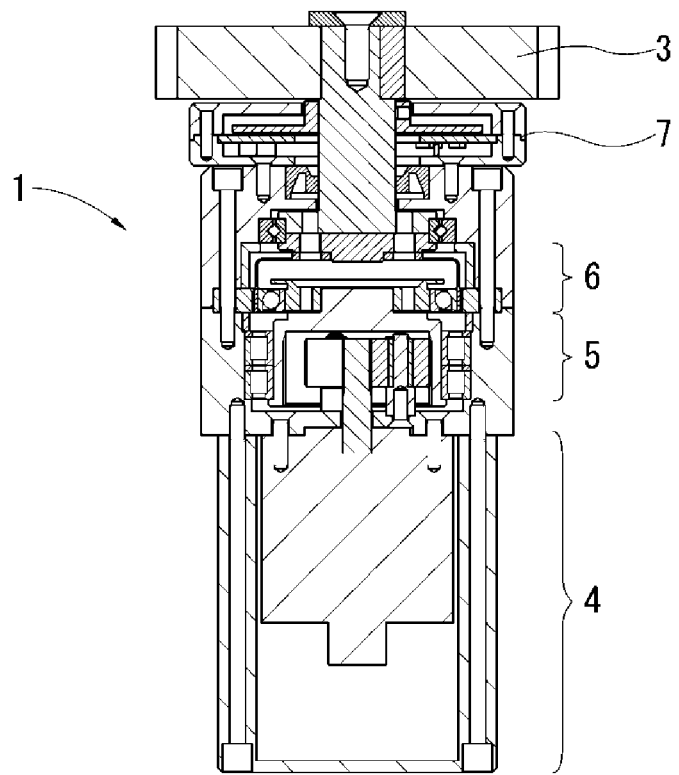
FIG. 2B is a schematic cross-sectional view showing an internal structure of the actuator seen from an A-A direction of an arrow of FIG. 2A)
Figure 3:
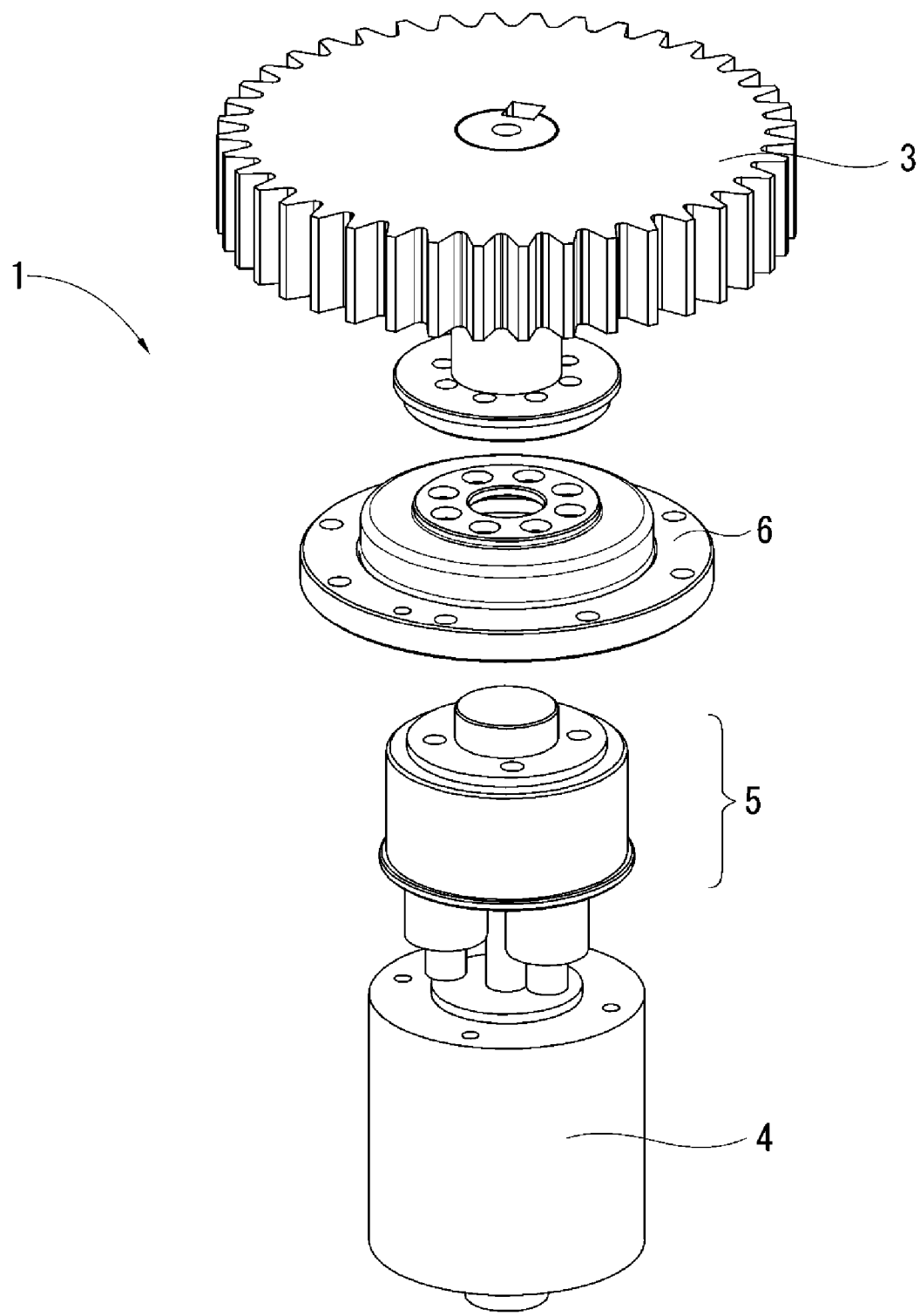
FIG. 3 is a schematic view showing a positional relationship between main structural members of the actuator.

The structure of the actuator 1 will be further described. As shown in FIG. 2A, FIG. 2B, and FIG. 3, the actuator 1 has the drive transmission gear 3, a motor 4, a friction drive speed reducer 5, a wave gear reducer 6, and an absolute encoder 7.

The motor 4 is a drive source in the actuator 1 to generate torque by which the valve rod of the valve 2 is rotated through the drive transmission gear 3. The motor 4 is formed of a brushless motor that is one of the direct-current-driven DC motors.

The friction drive speed reducer 5 is a speed reducer to obtain torque by reducing the rotation speed of a rotational shaft 410 (see FIG. 4 and FIG. 5) of the motor 4. The friction drive speed reducer 5 is a friction-type speed reducer that transmits power while using a friction force generated by the contact of its structural member. The friction drive speed reducer 5 is a member equivalent to a first speed reducer defined in the appended claims.

Additionally, the friction drive speed reducer 5 is a member that transmits power to the wave gear reducer 6 by reducing the rotational force of the motor 4 while restraining the occurrence of a sound. The friction drive speed reducer 5 is connected to the rotational shaft 410 of the motor 4.

Additionally, the friction drive speed reducer 5 has a reduction ratio of 1:5. A detailed structure of the friction drive speed reducer 5 is described later.

The wave gear reducer 6 is a speed reducer that transmits power to the drive transmission gear 3 while heightening torque by further reducing the rotation speed of power transmitted from the friction drive 5. The wave gear reducer 6 has a reduction ratio of 1:50. The wave gear reducer 6 is a member equivalent to a second speed reducer defined in the appended claims.

Additionally, the wave gear reducer 6 is a speed reducer that is composed of components, i.e., is composed of a wave generator, a flex spline, and a circular spline and that can obtain a high reduction ratio by means of the deceleration effect of a wave gear. An already-known wave gear reducer can be employed as the structure of the wave gear reducer 6, and a description of its detailed structure is omitted.

The absolute encoder 7 is a member that is attached to the drive transmission gear 3 and that performs position control with respect to the rotational operation of the drive transmission gear 3. The absolute encoder 7 is connected to a control system (not shown), and imposes position control on the rotational operation of the drive transmission gear 3. The position control performed by the absolute encoder is detailedly described later.

Here, the motor 4 is not necessarily required to be formed of a brushless motor, and, for example, if a DC power source is used, it is also possible to employ a motor provided with a brush or a stepping motor that is the same DC motor.

Additionally, a direct-current-driven DC motor is not necessarily required to be employed as the motor 4, and it is also possible to employ an alternating-current-driven AC motor in accordance with the kind of or the characteristic of a rotational mechanism to which power is to be transmitted by the actuator 1 or in accordance with power-source circumstances or the like of an environment in which the motor is used.

Additionally, the friction drive speed reducer 5 is not necessarily required to have a reduction ratio of 1:5, and the reduction ratio can be appropriately set. However, when the wave gear reducer 6 connected to the friction drive speed reducer 5 is driven, it is preferable to set the reduction ratio of the friction drive speed reducer 5 at a high reduction ratio from the viewpoint of making the rotation speed of the wave generator as small as possible so as to restrict its drive sound to a small level and from the viewpoint of generating a great torque in the drive transmission gear 3.

Additionally, the wave gear reducer 6 is not necessarily required to have a reduction ratio of 1:50, and the reduction ratio can be appropriately set. However, it is preferable to set the reduction ratio of the wave gear reducer 6 so as to fall within the range of 1:30 to 1:100 from the viewpoint of obtaining a greater torque by reducing a rotational force generated from the motor 4 by means of the friction drive speed reducer 5 and reducing power transmitted from the friction drive speed reducer 5 and from the viewpoint of restricting a drive sound of the wave generator to a small level by making the rotation speed of the wave generator as small as possible.

On the other hand, if the reduction ratio of the wave gear reducer 6 is a value of less than 1:30, there is a concern that torque that is applied to the drive transmission gear 3 will become small and will become insufficient as a driving force used when the valve rod of the valve 2 is rotated. Additionally, if the reduction ratio of the wave gear reducer 6 is a value that exceeds 1:100, there is a concern that the rotation speed of the wave generator will become higher, and the drive sound occurring from the wave gear reducer 6 will become louder although the torque to be applied to the drive transmission gear 3 becomes greater.

Additionally, the wave gear reducer 6 is not necessarily required to be employed as a speed reducer that transmits power, which has been transmitted from the friction drive 5, to the drive transmission gear 3. For example, it is also possible to use a gear reducer, such as a worm reducer or a planetary gear reducer, instead of the wave gear reducer. However, it is preferable to use the wave gear reducer 6 as a speed reducer that transmits power, which has been transmitted from the friction drive 5, to the drive transmission gear 3 from the viewpoint of enabling the wave gear reducer 6 to be disposed coaxially with the central axis of the motor 4 and with the central axis of the friction drive speed reducer 5 so as to enable the entire structure to be downsized, and from the viewpoint of having a high reduction ratio so as to enable a high torque to be easily output.

Next, the structure of each member will be described in more detail with reference to FIG. 4 and FIG. 5.

[Motor]

Figure 4:
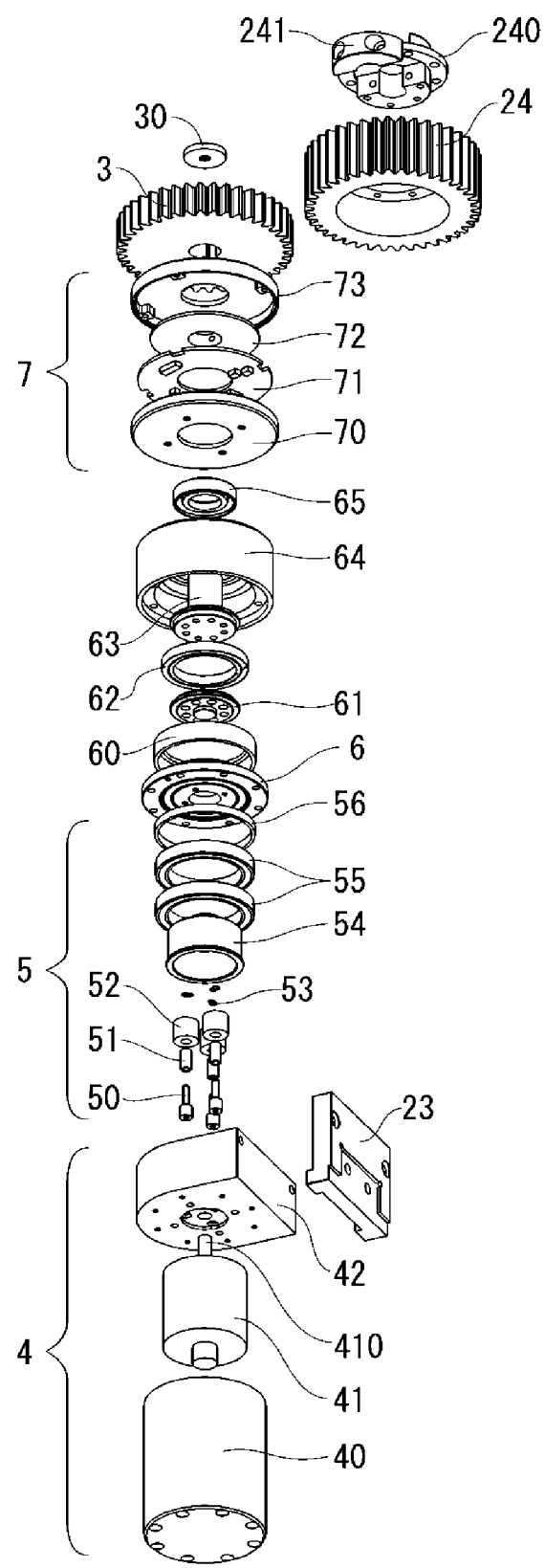
FIG. 4 is a schematic exploded view showing a state in which the actuator has been disassembled into members that are constituents of the actuator.

As shown in FIG. 4, the motor 4 has a cover body 40, a motor body 41, and a frame portion 42. The motor body 41 is provided with a rotational shaft 410.

The cover body 40 is a cover member that protects the motor body 41. The motor body 41 is a drive source of the motor 4, and is formed of a brushless motor connected to a DC power source (not shown). The details of control of the motor body 41 are described later.

The rotational shaft 410 of the motor 41 is a drive portion that rotates and transmits power to the friction drive speed reducer 5.

The frame portion 42 is a frame-shaped member that holds the motor body 41 and a rotor-portion shaft 50 that is a constituent of the friction drive speed reducer 5 described later. The holder 23 mentioned above is attached to the frame portion 42.

[Friction Drive Speed Reducer]

As shown in FIG. 4, the friction drive speed reducer 5 has the rotor-portion shaft 50, a bush 51, a rotor portion 52, a retaining ring 53, an inner roller 54, a bearing 55, and a collar portion 56.

The rotor-portion shaft 50 is a member that serves as a rotational shaft in the rotation of the rotor portion 52. In other words, the rotor-portion shaft 50 rotates together with the rotor portion 52. The bush 51 is a member that serves as a bearing that rotatably supports the rotor-portion shaft 50.

Figure 5A:
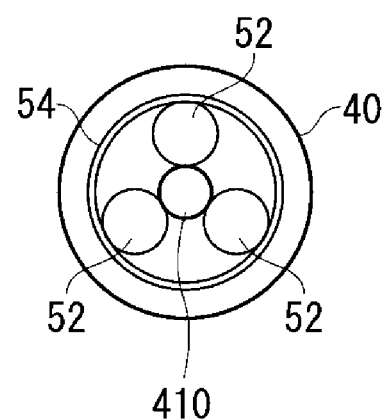
FIG. 5A is a partial schematic front view of a friction drive speed reducer.
Figure 5B:
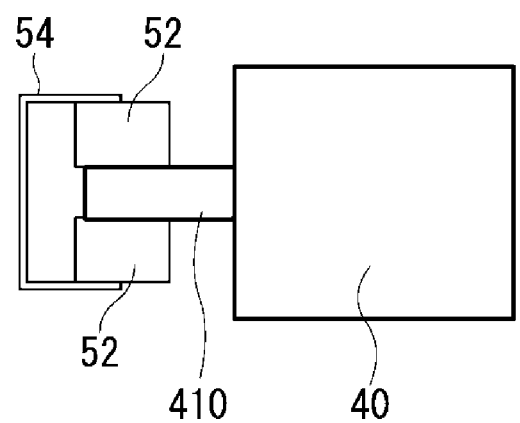
FIG. 5B is a schematic side view showing a state in which a motor and the friction drive speed reducer have been connected together.

As shown in FIG. 5A and FIG. 5B, the rotor portion 52 is a member that comes into contact with the rotational shaft 410 of the motor body 41 and with the inner roller 54 and that transmits the rotational force of the motor body 41 to the inner roller 54 through frictional resistance. The retaining ring 53 is a member that firmly holds the rotor portion 52.

The inner roller 54 is a member that is connected to a wave generator (not shown) of the wave gear reducer 6 and that transmits power, which has been transmitted from the rotor portion 52, to the wave gear reducer 6. The inner roller 54 is equivalent to a roller portion defined in the appended claims.

In other words, the friction drive speed reducer 5 reduces the power transmitted from the motor body 41 by means of the contact and the frictional resistance between the rotational shaft 410 and the rotor portion 52 and between the rotor portion and the inner roller 54, and hence generates torque. Additionally, the rotation speed of power generated by the motor body 41 is reduced, and is transmitted to the wave generator of the wave gear reducer 6.

In more detail, an outer peripheral surface of the rotational shaft 410 of the motor 4 comes into contact with an outer peripheral surface of each of the three rotor portions 52, and frictional resistance occurs at a contact place between the rotational shaft 410 and each of the rotor portions 52, and the power of the rotational shaft 410 is reduced by the frictional resistance (see FIG. 5A and FIG. 5B).

Additionally, the outer peripheral surface of each of the three rotor portions 52 comes into contact with an inner peripheral surface of the inner roller 54, and frictional resistance occurs at a contact place between each of the rotor portions 52 and the inner roller 54, and power transmitted from the rotational shaft 410 to the rotor portion 52 is further reduced by the frictional resistance (see FIG. 5A and FIG. 5B). As a result, the rotational power of the motor body 41 is reduced, and torque is generated.

The rotor portion 52 is made of urethane rubber that has a Shore hardness of 95. The surface roughness Ra of the outer peripheral surface of the rotor portion 52 is 1.6. The surface roughness Ra of the inner peripheral surface of the inner roller 54 is 1.6. The rotational shaft 410 is made of metal.

Here, the rotor portion 52 is not necessarily required to be made of urethane rubber whose Shore hardness is 95. However, the following advantages can be obtained by making the rotor portion 52 of urethane rubber whose Shore hardness is 95. In detail, it becomes easy to maintain a repulsive force against the rotational shaft 410 of the motor body 41 with which the rotor portion 52 is in contact, and it becomes difficult to allow the motor body 41 to be deformed by the contact with the rotational shaft 410, and hence the contact pressure between the rotational shaft 410 and the rotor portion 52 reaches an appropriate level. As a result, the power transmission performance between the rotational shaft 410 and the rotor portion 52 becomes excellent, thus making it possible to prevent the occurrence of noise when the motor body 41 and the rotor portion 52 rotate at a high speed. From these circumstances, it is preferable to make the rotor portion 52 of a material whose Shore hardness falls within the range of 85 to 95, and it is more preferable to make the rotor portion 52 of a material whose Shore hardness is 95.

The material of which the rotor portion 52 is made is not limited to urethane rubber, and specific limitations are not imposed on the material if its Shore hardness falls within the range of 85 to 95. For example, rigid resin made of polyacetal copolymer can be used besides urethane rubber.

The surface roughness Ra of the outer peripheral surface of the rotor portion 52 is not necessarily required to be 1.6, and the surface roughness Ra of the inner peripheral surface of the inner roller 54 is not necessarily required to be 1.6. However, in the contact between the outer peripheral surface of the rotor portion 52 and the inner peripheral surface of the inner roller 54, adhesive properties of both surfaces are heightened, and air does not easily enter a space between both surfaces, thus making it possible to increase frictional resistance. This makes it possible to improve the power transmission performance between the rotor portion 52 and the inner roller 54, and makes it possible to prevent the occurrence of a sound when the motor body 41 and the rotor portion 52 rotate. From these respects, it is preferable to set the surface roughness Ra of the outer peripheral surface of the rotor portion 52 at 1.6, and to set the surface roughness Ra of the inner peripheral surface of the inner roller 54 at 1.6. The surface roughness Ra is not limited to 1.6, and it is also possible to employ a smoother surface whose surface roughness is 1.6 or less.

The bearing 55 (see FIG. 4) is a member that serves as a bearing by which the inner roller 54 is rotatably supported. The collar portion 56 is a member that firmly holds the bearing 55.

Here, as far as a structure in which the friction drive speed reducer 5 is included in the actuator 1 is formed so as to be connectable to the motor 4 and to the wave gear reducer 6, specific limitations are not imposed on its contents.

[Wave Gear Reducer]

As shown in FIG. 4, the actuator 1 has the wave gear reducer 6, a collar portion 60, a spacer 61, a bearing 62, a shaft 63, a frame portion 64, and a seal portion 65.

As described above, the wave gear reducer 6 is a speed reducer that transmits power to the drive transmission gear 3 while heightening torque by further reducing the rotation speed of power transmitted from the friction drive 5 (the inner roller 54).

The collar portion 60 is a member that supports the bearing 62 that serves as a bearing portion of the shaft 63. The spacer 61 is a connection member that connects a hole formed in a flex spline (whose reference sign is omitted) of the wave gear reducer 6 and the shaft 63 together.

The bearing 62 is a member that serves as a bearing that rotatably supports the shaft 63. The shaft 63 is a member that transmits power, which has been transmitted from the wave gear reducer 6, to the drive transmission gear 3. The shaft 63 rotates, and resultant power is transmitted to the drive transmission gear 3.

The frame portion 64 is a case member in which the wave gear reducer 6 is housed. The seal portion 65 is a sealing member that prevents water or dust from entering the inside of the frame portion 64 from the outside.

Here, as far as a structure in which the wave gear reducer 6 is included in the actuator 1 is formed so as to be connectable to the friction drive speed reducer 5 and so as to allow power to be transmitted to the drive transmission gear 3, specific limitations are not imposed on its contents.

[Encoder]

As shown in FIG. 4, the absolute encoder 7 has a substrate-fixing base portion 70, an absolute substrate 71, a rotary magnet 72, and a cover portion 73. As described above, the absolute encoder 7 is a member that is attached to the drive transmission gear 3 and that performs position control with respect to the rotational operation of the drive transmission gear 3. The absolute encoder 7 is configured so that it can store the absolute position of the drive transmission gear 3.

The term "position control with respect to the rotational operation of the drive transmission gear 3" performed by the absolute encoder 7 mentioned here means drive control that, with respect to the rotational operation of the drive transmission gear 3 performing multiple rotations, secures reproducibility of a stopping position so that its rotation stops at a desired operational position by means of the actuator 1.

The substrate-fixing base portion 70 is a base member that fixes the absolute substrate 71. The absolute substrate 71 is a substrate that outputs positional information concerning a position at which the multiple-rotations operation of the drive transmission gear 3 has stopped.

The absolute substrate 71 is connected to a driver of the motor body 41 described later by means of a control system (not shown), and, based on positional information from the absolute substrate 71, the control system performs feedback control with respect to a rotation amount of the rotational shaft 410 of the motor body 41.

The rotary magnet 72 is a detection member that detects the rotation of the drive transmission gear 3. The cover portion 73 is a cover member that protects the substrate-fixing base portion 70, the absolute substrate 71, and the rotary magnet 72.

The term "feedback control" mentioned here means control performed to, in the rotation of the drive transmission gear 3, calculate a slip amount based on a difference between a theoretical rotation amount when operated and a practical rotation amount and adjust a rotation amount of the rotational shaft 410 of the motor body 41 so as to correct the slip amount.

The absolute encoder 7 has a resolution of 16 bit. This enables the absolute encoder 7 to perform the position control of the rotation of the drive transmission gear 3 so that the resolution of the rotation of the drive transmission gear 3 becomes ±0.0125 degrees or less.

As a result, when the valve rod of the valve 2 is rotated by torque transmitted from the drive transmission gear 3, it is possible to highly accurately rotate the valve rod in a state in which the resolution of the valve rod is ±0.25 degrees or less.

As thus described, the resolution of the valve rod is set at ±0.25 degrees or less, thus making it possible to reproduce the open/close position of the thin valve 2, for example, in fluid control in the actuator 1 or the valve 2.

Additionally, the fact that it is possible to highly accurately control the rotation of the valve rod makes it possible to highly accurately cope with a case in which the open/close degree of the valve 2 is adjustably set while detecting the flow amount of a fluid or a case in which a reset operation is performed when it becomes impossible to determine the open/close position of the valve 2 because of the occurrence of a power failure.

Here, the actuator to which the present invention has been applied is not necessarily required to have the absolute encoder 7. However, in a structure in which the power of the motor body 41 is reduced by the friction drive speed reducer 5 and by the wave gear reducer 6, the interposition of the friction drive speed reducer 5 lowers the accuracy of the position control in the rotational operation of the drive transmission gear 3. Therefore, it becomes possible to highly accurately perform position control by performing the position control of the rotation of the drive transmission gear 3 by means of the absolute encoder 7. In a case in which high accuracy is not required in equipment to which the actuator is to give torque, it is possible to use an actuator to which an absolute encoder is not attached.

The actuator 1 has a washer 30 as shown in FIG. 4. The washer 30 is a member that firmly holds the drive transmission gear 3.

Additionally, as shown in FIG. 4, the shaft-side gear 24 attached to the valve rod of the valve 2 is provided with a gear clamp 240 and a clamp 241. The gear clamp 240 and the clamp 241 are each a member used to attach the shaft-side gear 24 to the valve rod of the valve 2.

[With respect to Control/Frequency of Motor]

Next, the control of the motor body 41 will be described. The motor body 41 is connected to a control system (not shown), and its driving is controlled. The system that controls the driving of the motor body 41 is also connected to the absolute encoder 7 mentioned above.

In more detail, the brushless motor that is a constituent of the motor body 41 is configured so that its driving is controlled by the control system formed of a controller and a driver. The controller is a commander that outputs an operation command signal to the driver.

The driver is a control portion that outputs a pulse signal to the motor body 41 so as to obey a command signal emitted from the controller. Based on the pulse signal, the motor body 41 allows a drive/detection portion included in the motor body 41 to drive the rotational shaft 410 or to detect the operation of the rotational shaft 410.

The driver has a CPU and a pulse chip, and the CPU issues a command to the pulse chip, and the pulse chip outputs a pulse signal. The motor body 41 is controlled by a pulse signal whose pulse modulation frequency is 20 kHz.

Here, for example, in generally-used servo motors, the motor is controlled by a pulse signal whose pulse modulation frequency is 10 kHz. However, in the actuator 1 of the present invention, a driver capable of outputting a pulse signal whose pulse modulation frequency is 20 kHz is constructed, and the motor body 41 is controlled.

This makes it possible to make a period of time during which a pulse signal to rotate the rotational shaft 410 is output shorter than a period of time during which a pulse signal whose pulse modulation frequency is 10 kHz is output as in conventional techniques, and makes it possible to drive the rotational shaft 410 more smoothly than in conventional techniques. As a result, it is possible to restrict sounds and/or vibrations caused when the motor body 41 runs to a low level.

In the actuator 1 that is one example of actuators to which the present invention has been applied as described above, quietness is sufficiently secured in the driving of the drive transmission gear 3 that rotates the valve rod of the valve 2. In more detail, the drive sound of the drive transmission gear 3 is 30 db or less.

Specific limitations are not imposed on a measurement method for measuring the drive sound here if this measurement method is a method that enables the measurement of the magnitude of the drive sound. For example, it is possible to employ a method in which a noise measurement device is placed one meter away from the actuator 1 in the horizontal distance, and the drive sound caused when the actuator 1 is driven by use of the noise measurement device.

This quietness of the actuator 1 is achievable by reducing the driving force of the motor 4 by means of the friction drive speed reducer 5, thereafter by transmitting the resultant driving force to the wave gear reducer, thereafter by reducing the driving force, and by transmitting the resultant driving force to the drive transmission gear 3. Additionally, the sound caused by the motor 4 is also restricted to a lower level by controlling the motor body 41 at a pulse modulation frequency of 20 kHz.

Additionally, although the actuator 1 is small in size, it is possible to obtain a high reduction ratio (a final reduction ratio from the motor 4 to the drive transmission gear 3 is 1:250), and it is possible to output a high torque equal to or more than 50 Nm to the valve rod of the valve 2.

Additionally, the position control of the rotation of the drive transmission gear 3 is performed by the absolute encoder 7, thus enabling the actuator 1 to highly accurately perform the position control of its rotational operation.

As described above, the actuator to which the present invention has been applied is an actuator that is capable of securing sufficient quietness when driven, that is small in size, that has excellent power transmission performance because of a high reduction ratio, and that is capable of performing highly accurate control.

Reference Signs List

1 Actuator
2 Valve
20 Valve body
21 Handle
23 Holder
24 Shaft-side gear
240 Gear clamp
241 Clamp
3 Drive transmission gear
4 Motor
40 Cover body
41 Motor body
410 Rotational shaft
42 Frame portion
5 Friction drive speed reducer
50 Rotor-portion shaft
51 Bush
52 Rotor portion
53 Retaining ring
54 Inner roller
55 Bearing
56 Collar portion
6 Wave gear reducer
60 Collar portion
61 Spacer
62 Bearing
63 Shaft
64 Frame portion
65 Seal portion
7 Absolute encoder
70 Substrate-fixing base portion
71 Absolute substrate
72 Rotary magnet
73 Cover portion

The invention claimed is:
1. An actuator comprising:
a motor that serves as a drive source;
a friction-drive-type first speed reducer that reduces a rotation speed of a rotational shaft of the motor while being in contact with the rotational shaft of the motor;
a second speed reducer that is connected to the first speed reducer and is configured to further reduce the rotation speed, the second speed reducer being a gear reducer; and
a final shaft that is connected to the second speed reducer and to a predetermined rotational mechanism,
wherein the final shaft transmits output of the motor to the predetermined rotational mechanism.
2. The actuator according to claim 1, wherein the second speed reducer is a wave gear reducer.

3. The actuator according to claim 1, wherein a magnitude of a drive sound caused when the output of the motor is transmitted to the final shaft is about 30 db or less.

4. The actuator according to claim 1, wherein the motor is controlled by a pulse signal having a pulse modulation frequency of about 20 kHz or more.

5. The actuator according to claim 1, further comprising an absolute encoder that is attached to the final shaft,
   wherein the absolute encoder stores an absolute position of the final shaft and is configured to performs position control relative to a rotation of the final shaft, and
   wherein resolution of the rotation of the final shaft is ±0.0125 degrees or less.

6. The actuator according to claim 1, wherein the first speed reducer includes a rotor portion into which a rotation of the motor is transmitted, and
   wherein the rotor portion has a Shore hardness of from about 85 to about 95.

7. The actuator according to claim 1, wherein the first speed reducer includes:
   a rotor portion into which a rotation of the motor is transmitted; and
   a roller portion that is disposed outside the rotor portion and that transmits the output of the motor to the second speed reducer while an inner peripheral surface of the roller portion is in contact with an outer peripheral surface of the rotor portion,
   wherein the outer peripheral surface of the rotor portion and the inner peripheral surface of the roller portion are each formed as a smooth surface with a surface roughness Ra that is about 1.6 or less.

8. The actuator according to claim 1, wherein a reduction ratio from the motor to the final shaft is about 1:150 to about 1:500.

9. The actuator according to claim 1, wherein the predetermined rotational mechanism is a valve rod of a valve, and
   wherein the valve is connected to the final shaft through a gear.

* * * * *